United States Patent [19]
Saunders

[11] 4,114,719
[45] Sep. 19, 1978

[54] DASH CONSOLE ACCESS ENABLING TILTING STEERING COLUMN

[75] Inventor: James Warren Saunders, Milpitas, Calif.

[73] Assignee: Paccar Inc., Bellevue, Wash.

[21] Appl. No.: 764,084

[22] Filed: Jan. 31, 1977

[51] Int. Cl.² ............................................. B62D 1/18
[52] U.S. Cl. ...................................... 180/90; 74/492; 280/775
[58] Field of Search ................. 180/90; 280/752, 775, 280/779; 74/492, 493

[56] References Cited

U.S. PATENT DOCUMENTS

| 1,619,980 | 3/1927 | Kelsey | 280/775 X |
| 1,835,456 | 12/1931 | Bernard | 180/90 |
| 2,959,425 | 11/1960 | Rogant | 280/775 |
| 3,580,101 | 5/1971 | Jorgensen | 280/775 X |

FOREIGN PATENT DOCUMENTS 2,342,379  2/1975  Fed. Rep. of Germany ............ 180/90

Primary Examiner—Joseph F. Peters, Jr.
Assistant Examiner—Terrance L. Siemens
Attorney, Agent, or Firm—Owen, Wickersham & Erickson

[57] ABSTRACT

In the driver's compartment of a motor vehicle, a dash console containing instruments and controls is hinged along a bottom edge to dash structure of the compartment. A steering wheel column is pivotally mounted by a pivot joint to the floor of the compartment and is clamped by an openable clamp to the dash structure into an upright operating position. When the clamp is opened, the steering column may be swung downwardly about the pivot point until the steering wheel rests upon a driver's seat. Then the dash console may be swung from its normally upright operating position downwardly to an access-providing position against the reclining steering column thereby enabling maintenance personnel convenient access to the backside of the dash console.

6 Claims, 4 Drawing Figures

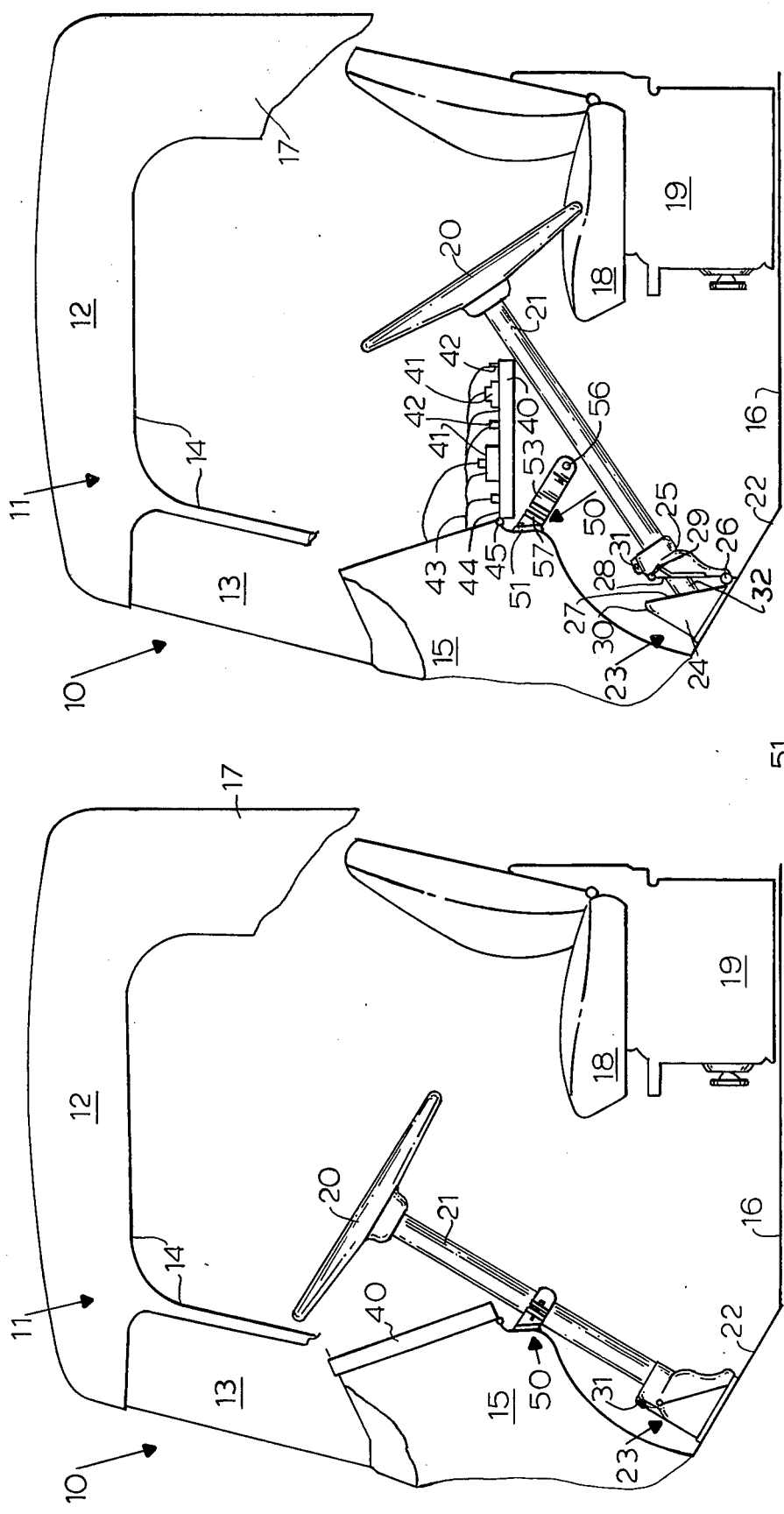
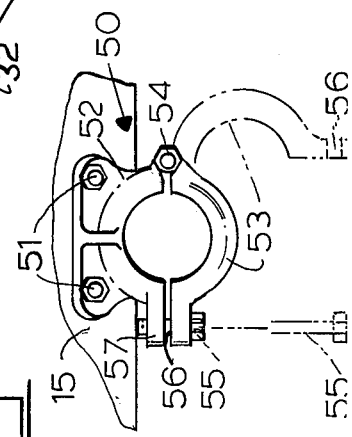
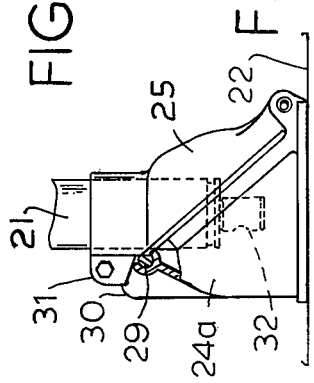

DASH CONSOLE ACCESS ENABLING TILTING STEERING COLUMN

BACKGROUND OF THE INVENTION

The present invention relates to a tilting steering column for a motor vehicle, and more particularly relates to a steering column that is tiltable downwardly to enable a hinged dash panel to be swung open for backside access.

Adjustable steering columns were known in the prior art. Those columns were typically movable between various positions to provide the driver with operating convenience and comfort. In one prior art reference known to the applicant, U.S. Pat. No. 3,309,103, a tiltable vehicular steering column was disclosed in combination with a tilt cab truck vehicle wherein the steering column, rigidly fixed to the cab, tilted with the cab to enable access to the power train therebelow.

In the larger motor vehicles, such as buses and motor trucks, the dash console contains a substantial number of indicators and controls, far more than are customarily encountered in passenger automobiles. One substantial problem, overcome by the present invention, has been the lack of ready access to the backside of such dash consoles, access commonly required by maintenance personnel. Even in those trucks and buses having dash consoles which were fairly easily detached from the driver compartment front wall structure, heretofore there has been no convenient place in the driver's compartment upon which to rest the detached console to perform measurements and adjustments.

Another problem overcome by the present invention has been the danger of electrical shorts with concomitant likelihood of fire and damaged wiring resulting from a dash console being entirely detached from the front wall structure of the driver's compartment. Inadvertent bumping or jarring of the console during detachment has also presented a problem.

A further problem overcome by this invention is that any movable steering column must be capable of being securely locked into its intended operating position in a way that is unmistakably indicative of the locked, operable condition.

SOME OBJECTS OF THE INVENTION

An object of the present invention is to provide convenient access to a motor vehicle dash console, which is hinged along its lower edge so as to be swingable from a closed upright operating position to an open backside-upward access position, without interference from the steering column.

Another object of the present invention is to provide a steering column which is tiltable from an upright operating position secured adjacent to the upright dash console to a downward position, thereby enabling the dash console to be swung to its access position.

Yet another object of the present invention is to provide a tiltable steering column which may be locked securely in an upright operating position by installation of a single bolt in a steering column clamp.

A further object of the present invention is to provide structure such that the downwardly tilted steering column becomes a support stand for the dash console when the console is placed in its backside-upward access position.

SUMMARY OF THE INVENTION

These and other objects and advantages are accomplished by an instrument-containing dash console being hinged along its bottom edge to fixed front wall structure of a driver's compartment of a motor vehicle. A steering column is pivotally mounted by a pivot joint to the floor of the compartment, and is held in an upright operating position adjacent the upright dash console by an openable clamp fixed to the front wall structure.

In this invention, the pivot joint is readily unlocked, as by loosening a single bolt. When the clamp is opened, the steering column may be tilted downwardly and rearwardly until the steering wheel rests upon the driver's seat. The dash console may then be swung downwardly from its normally upright operating position to an open backside-upward access position. Preferably, the dash console rests upon, and is stabilized and supported by, the downwardly and backwardly tilted steering column. Thereby the maintenance personnel are provided with readily available, comfortable, full access to the backside of the dash console and to the wiring, fuses, and components connected to and forming the indicators, switches and controls mounted in the dash console.

Other objects, advantages and features of the invention will become apparent from the following detailed description of a preferred embodiment presented in conjunction with the accompanying drawings.

BRIEF DESCRIPTION OF THE DRAWINGS

In the drawings:

FIG. 1 is a left side view in elevation of a driver's compartment of a motor truck tractor vehicle, with the left side broken away to show the dash console, steering column, and driver's seat.

FIG. 2 is the same view shown in FIG. 1, except that the steering column has been unlocked and tilted backwardly to rest upon the seat, and the dash console has been swung downwardly to a resting position upon the steering column, in accordance with the principles of the present invention.

FIG. 3 is a detailed plan view along the steering column axis of the openable steering column clamp mounted on a portion of the front wall structure of the driver's compartment shown in FIGS. 1 and 2. The open position of the clamp is shown in broken lines.

FIG. 4 is a detail view in side elevation of a pivotable joint assembly shown in closed position with a portion of the base fitting broken away to show a seal and with the steering column and cab floor broken off to save drawing room.

DETAILED DESCRIPTION OF A PREFERRED EMBODIMENT

A pertinent portion of a motor truck tractor 10 embodying the principles of the present invention is shown in FIGS. 1 and 2. As illustrated by these figures, the tractor 10 includes a cab 11 providing a driver's compartment. The cab 11 includes a roof 12, front windshield 13, an opening 14 for a left side access door, not shown, a front fire wall structure 15 below the windshield 13, a floor structure 16 and a back wall structure 17.

Within the cab, a driver's seat 18 is mounted upon a suitable pedestal 19, which is itself secured to the cab floor 16. In front of the driver's seat 18 is a steering wheel 20 which is journalled through and supported by a steering column 21. The column 21 is secured at its base to a forwardly slanted portion 22 of the cab floor 16 by a pivotable joint assembly 23, shown in a closed position in FIG. 1 and an open tilted position in FIG. 2.

As shown in FIG. 2, the joint assembly 23 has two major parts which are complementary with each other: a base fitting 24 rigidly secured to the slanted forward cab floor 22 and a pivotable collar 25 secured to the base of the steering column 21. The base fitting 24 and collar 25 are pivotally joined together by a horizontally disposed hinge pin 26 coincident with the axis of movement of the collar portion 25 relative to the base fitting 24 and the remainder of the cab 11. The base fitting 24 and the collar 25 have oppositely facing, flat sealing surfaces 27 and 28 respectively, which, in combination with an O-ring 29, or other form of suitable gasket, provide an oil, grease, and air tight seal when the joint assembly 23 is closed and the surfaces 27 and 28 come together. A single tab 30 on the base fitting 24 engages a recess in a projecting portion 31 of the collar to prevent sidewise movement of the column 21 when it is in the closed, operational position. A shaft 32, attached rigidly to the steering wheel 20 is shown with a lower segment exposed in FIG. 2. The shaft 32 is provided at its lowermost end with a key, not shown, for engaging the moving linkage of the steering system of the tractor 10 when the joint assembly is in its closed, operational position, as shown in FIG. 1.

Shown in FIG. 4 is a slightly different embodiment of the pivotable joint assembly 23 as illustrated in FIGS. 1 and 2. In the FIG. 4 embodiment a base fitting 24a is provided with a peripheral channel which holds the O-ring gasket 29 in place. The O-ring 29 provides an effective oil, grease, and airtight seal inside the assembly when the collar portion 25 is closed against the base fitting 24a so that the gasket 29 seals against the periphery of the collar portion. The single tab 30 and recess defining projecting portion 31 are the same in both embodiments of the joint assembly 23 and are shown in perhaps better detail in FIG. 4.

Also mounted inside the cab 11 is a dash console 40, to which a plurality of indicators 41 and controls 42 are secured so as to be visible and accessible to a driver during vehicle operation. As is well known, the indicators 41 and controls 42 are connected to operating parts, sensors, and circuits of the vehicle 10 via cables 43 connected at the backside 44 of the console.

From time to time it is necessary for maintenance technicians to gain access to the backside 44 of the dash console 40, and, in accordance with the principles of the present invention, the dash console 40 is attached along its lower horizontal edge to the front wall structure 15 of the cab 11 by a horizontally aligned hinge 45. Thus, the dash console 40 may be moved from an upright operating position as shown in FIG. 1 to an open position. If the steering wheel 20 and steering column 21 were to remain in their normal operating positions, access to the console 40 would be very limited and inconvenient. However, in the present invention the console 40 can be swung down to a position wherein the backside 44 faces upwardly, as shown in FIG. 2, provided, however, that the steering column 21 is tilted away from the front wall structure 15 sufficiently, so that the steering wheel 20 will not impede the rotational downward movement of the console 40 to its open position. Then there is free access to the backside of the console 40. Concomitantly, the console 40 is securely supported in its open position by resting upon the steering column 21 in its fitted position, as shown in FIG. 2.

During vehicular operations of the truck 10 it is imperative that the steering column 21 be rigidly secured in place. For this need, a clamp 50 is provided. The clamp 50 is secured to the front firewall 15 adjacent to and below the hinge 45 of the dash console 40, as by bolts 51. The clamp 50 (see FIG. 3) has two parts, a fixed portion 52, which is secured to the wall 15 by the bolts 51, and an openable hinged portion 53 pivotally joined to the fixed portion 52 by a pin 54. The openable portion 53 is locked in the fixed portion 52 by a single bolt 55 passing through an opening 56 of the openable portion 53 and into engagement with an aligned threaded opening 57 of the fixed portion 52, as shown in FIG. 3. A feature of this invention is that only the single bolt 55 need by taken out in order for the steering column 21 to be swung backwardly about the pivot 26.

As will be appreciated by the comparison of FIGS. 1 and 2, the clamp 50 in its closed and locked position rigidly secures the steering column 21 in an upright, forward position, yet it enables the steering column 21 to be tilted downwardly and backwardly when opened by removal of the locking bolt 55 and rotation of the hinged portion 53. Conveniently, the steering wheel 20 tilts back to a resting position upon the driver's seat 18, and the dash console 40 is supported by the steering column 21, thereby providing complete, convenient access to the backside 44 of the console without any danger arising from unwanted movement of the opened dash console during maintenance procedures.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a motor vehicle having a driver's compartment enclosed in the front by a windshield and by a front wall below the windshield, said compartment having a floor and other wall structure and containing a floor-mounted steering column with a steering wheel at its upper end, a driver's seat behind said steering column and a dash console lying below said windshield and with a lower edge lying close to and in front of said steering column, said console having a plurality of indicators, controls, and the like mounted therein so as to be viewable and operable by a driver occupying said seat, the combination therewith of:

said bottom edge of said dash console being hinged to said front wall along a generally horizontal axis, said dash console thereby being rotatable along said axis from a closed upright operating position to an open access-enabling position, the amount of opening being limited by the console coming against said steering column or said steering wheel, a pivot joint securing said steering wheel column pivotally to said floor, and a readily openable locking clamp secured to said front wall below said console for securing said steering column in an upright operating position adjacent to said console, whereby said clamp may be opened, and said column may then be tilted downwardly and rearwardly, relative to said console, thereby enabling said console to be moved to a backside-upward fully open generally horizontal access-enabling position.

2. The vehicle as set forth in claim 1 wherein a top edge portion of said console rests upon and receives support from said steering column when tilted rearwardly and downwardly and when said console is in said generally horizontal access-enabling position.

3. The vehicle as set forth in claim 2 wherein said steering wheel rests upon said driver's seat when said column is tilted rearwardly and downwardly.

4. The vehicle as set forth in claim 1 comprising a motor truck tractor.

5. The vehicle as set forth in claim 1 wherein said readily openable clamp comprises a fixed member secured to said front wall and a movable member joined to said fixed member by a hinge on one side and by a single locking bolt on the other side thereof, so that said clamp is opened by nothing more than removing said bolt and swinging said movable member about said hinge.

6. In a motor vehicle having a driver's compartment enclosed in the front by a windshield and by a front wall below the windshield, said compartment having a floor and other wall structure and containing a floor-mounted steering column with a steering wheel at its upper end, a driver's seat behind said steering column and a dash console lying below said windshield and with a lower edge lying close to and in front of said steering column, said console having a plurality of indicators, controls, and the like mounted therein so as to be viewable and operable by a driver occupying said, the combination therewith of:

said bottom edge of said dash console being hinged to said front wall along a generally horizontal axis, said dash console thereby being rotatable along said axis from an upright operating position to a backside-upward, access-enabling position, a pivot joint securing said steering wheel column pivotally to said floor, said pivot joint including sealing means for sealing lubricating material within said joint and means for preventing sideways sway when said column is in said upright operating position, and a locking clamp secured to said front wall for securing said steering column in an upright operating position adjacent to said console, whereby said clamp may be opened, and said column may then be tilted downwardly and rearwardly, relative to said console, thereby enabling said console to be moved to a fully open access-enabling position.

* * * * *